May 6, 1930.  W. A. HEINRICH  1,757,573
METHOD OF MAKING SPRAY GUNS
Filed March 7, 1921  3 Sheets-Sheet 1
Fig. 1.
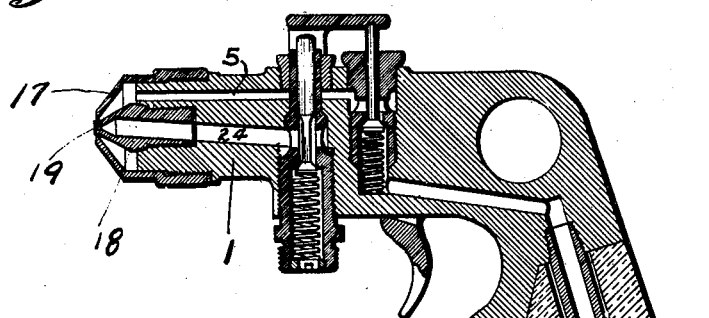
Fig. 2.
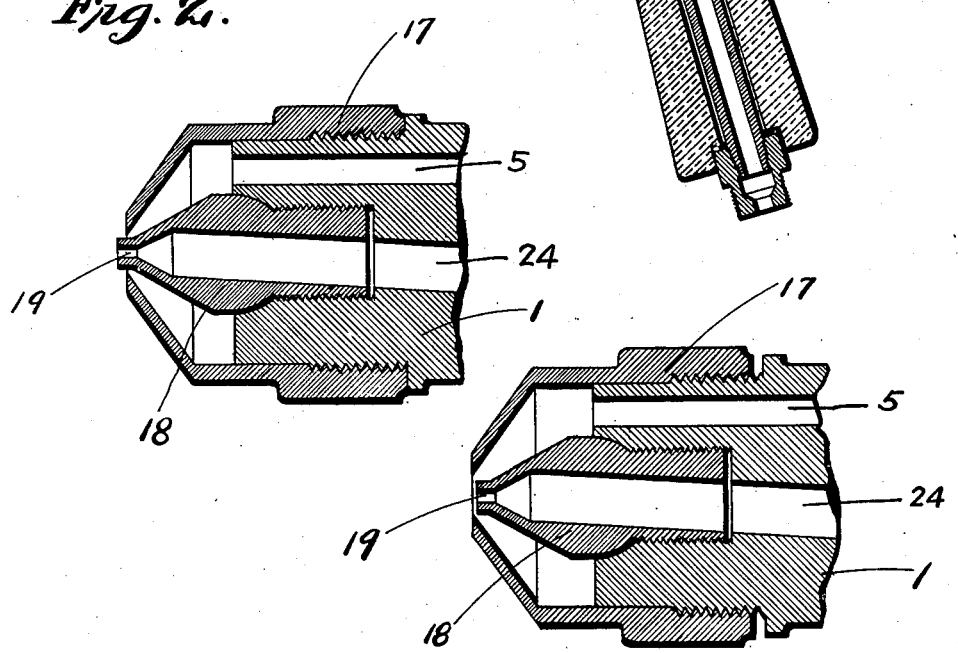
Fig. 3.
Fig. 4.
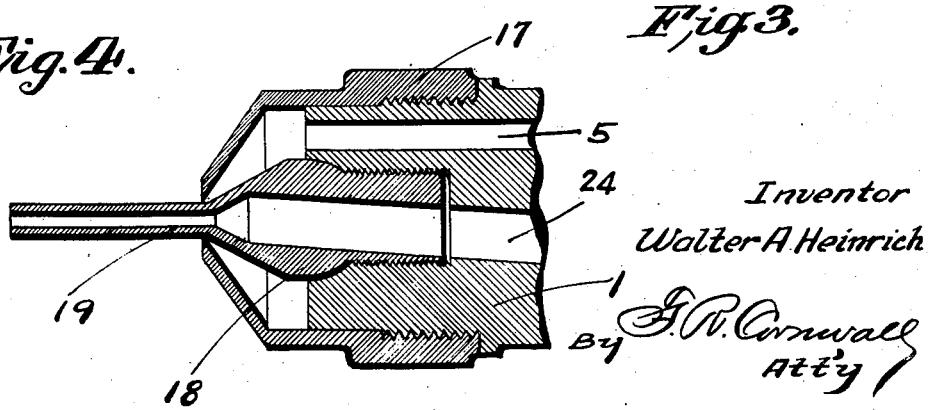
Inventor
Walter A. Heinrich
By G. W. Cornwall
Att'y May 6, 1930.    W. A. HEINRICH    1,757,573
METHOD OF MAKING SPRAY GUNS
Filed March 7, 1921    3 Sheets-Sheet 2
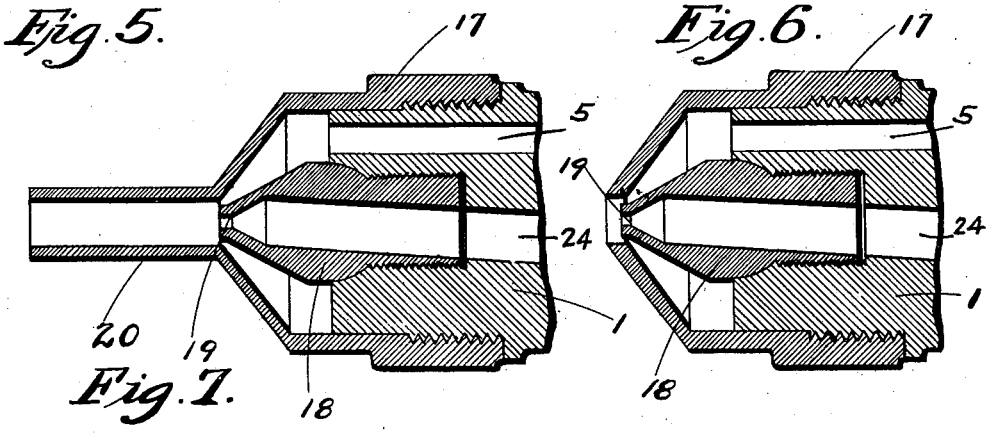
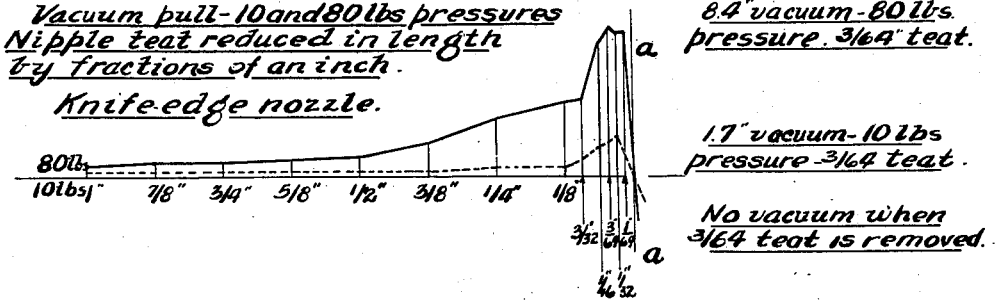
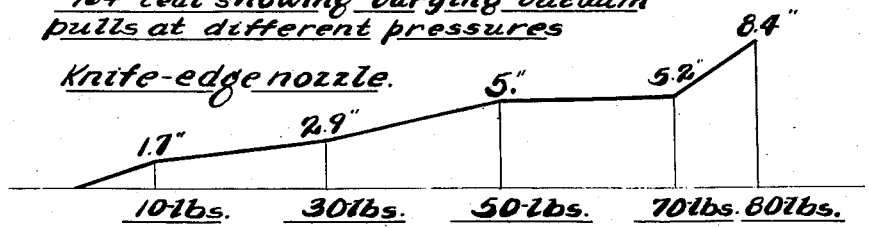
Inventor
Walter A. Heinrich
By F. R. Cornwall
Atty May 6, 1930.　　　W. A. HEINRICH　　　1,757,573
METHOD OF MAKING SPRAY GUNS
Filed March 7, 1921　　　3 Sheets-Sheet 3
Fig. 9.　Fig. 10.　Fig. 11.　Fig. 12.
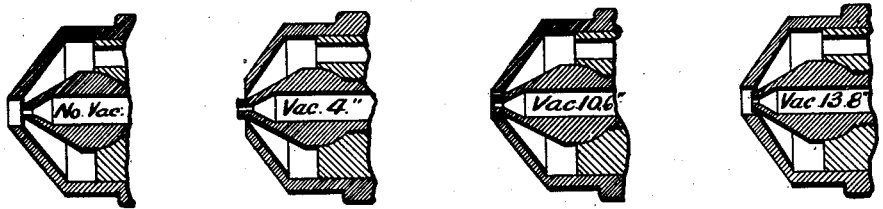
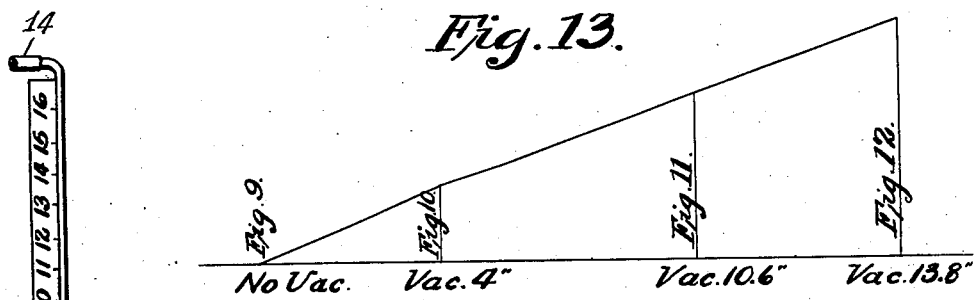
Fig. 13.
Fig. 14.
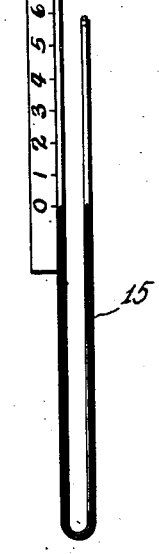
Inventor
Walter A. Heinrich
By J. R. Cornwall
Atty.

Patented May 6, 1930

1,757,573

UNITED STATES PATENT OFFICE

WALTER A. HEINRICH, OF ST. LOUIS, MISSOURI, ASSIGNOR, BY MESNE ASSIGNMENTS, TO W. N. MATTHEWS CORPORATION, OF ST. LOUIS, MISSOURI, A CORPORATION OF MISSOURI

METHOD OF MAKING SPRAY GUNS

Application filed March 7, 1921. Serial No. 450,252.

In the manufacture of spray guns, for paint, sand, wood preservatives, insecticides, etc., it is necessary to adjust the discharge elements of each gun when assembled in order to secure the most efficient delivery of the material to be sprayed, the adjustment varying with each variation in the dimensions of the elements, with the material to be sprayed and with the fluid pressure to be used for actuating the gun. These adjustments have heretofore been made largely by judgment and by the use of cards which are sprayed, and the efficiency of the gun determined by judging the extent and evenness of the distribution of the material on the card. The object of my invention is to provide a simpler, quicker, and more accurate method of testing and adjusting spray guns.

In the accompanying drawings:

Figure 1 is a sectional view through a spray gun.

Figure 2 is an enlarged sectional view through the nozzle thereof.

Figure 3 is a similar view showing the nozzle adjusted to a different position.

Figure 4 is a similar view showing an elongated teat on the nipple used in carrying out one of the efficiency tests.

Figure 5 is a similar view showing an elongated cylindrical bore used in carrying out one of the efficiency tests.

Figure 6 is a view of the nozzle produced as a result of the successively reducing lengths of the teat and cylindrical bore to secure the greatest efficiency with a given spraying material and predetermined fluid pressures.

Figure 7 is a graphical illustration showing the highest efficiency preliminary test of a shortened nipple teat.

Figure 8 is a graphical illustration showing different vacuum pulls in mercurial inches in the highest efficiency tests at different pounds pressure.

Figures 9 to 12, inclusive, are comparative forms of nozzles tested.

Figure 13 is a graphical illustration of the values of the vacuum pulls in mercurial inches produced by the forms of nozzles shown in Figures 9 to 12.

Figure 14 is a conventional illustration of a mercury test tube used in determining the vacuum in mercurial inches by the various nozzles under test.

The method hereinafter described relates to spray guns made in accordance with the disclosures of U. S. Patent No. 1,330,448, dated February 10, 1920, granted upon the application of G. McD. Johns (jar type) and my Patent No. 1,382,641, granted June 28, 1921.

It is quite apparent that the size of the opening in the nozzle, the direction in which the compressed air is emitted therefrom, the diameter and length of the cylindrical teat on the paint carrying nipple, the distance or location of its discharge extremity with relation to the point where the nozzle ceases to have a restraining and controlling influence on the compressed air, the pounds pressure per square inch of compressed air, and the viscosity of the paint, all are factors in determining the vacuum pull on the paint through the nipple, and hence, all contribute to or detract from the efficiency of the gun, i. e., they affect the quantity of paint thrown at a given pressure and of a given viscosity.

In Figures 1, 2 and 3 I have shown a type of spray gun in which 1 indicates the barrel, 18 the nipple threaded therein and provided with aligned borers of different diameters communicating with the paint conduit 24, (the mouth of the nipple being contracted and ending in a cylindrical teat 19) and normally extending through an opening in the nozzle 17 and slightly beyond the nozzle, which nozzle is threaded on the end of the barrel, and into which nozzle air is admitted through a conduit 5, said air and paint conduits being controlled by suitable valves.

To illustrate the practical operation of such a gun, I will state that by the use of air at 70 pounds pressure, a vacuum pull (suction) of 5.2 mercury inches can be created in the paint conduit, when the parts are adjusted as shown in Figure 2. This vacuum "pull" or "suction" is determined by connecting the paint hose or flexible rubber tube 14 to a bent quarter-inch glass tube 15, containing mercury, as shown in Figure 14.

The mercury is lifted two and six-tenths inches in the long leg of the tube in this test and is depressed an equal amount in the short leg, so that the vacuum is indicated by doubling the readings on the inch scale shown. The short leg of the tube is open to atmosphere.

It is this outlined manner of reading partial vacuums induced in the paint line, which I propose to employ in ascertaining correct part sizes and settings.

By adjusting the nozzle outwardly over the teat on the nipple, as shown in Figure 3, the vacuum pull is gradually reduced until zero, or the "no pull" point is reached. This adjustment or relative change in the position of the parts is comparatively small but highly effective upon the "pull." It is therefore necessary to make this setting carefully for a maximum suction effect, and therein lies the advantage of taking the sensitive manometer readings as against the old method of judgment. We can thus obtain by the manometer means the correct relationship between nozzle and nipple, as regards a proper setting. (See Fig. 2.) It remains to ascertain their correct length of orifice, bores being taken as constant inasmuch as said bores are not easily changed.

Referring now to Figure 4, the teat on the nipple is shown as extended a considerable distance beyond the nozzle. It is, of course, obvious that if this teat 19 was of such length that the compressed air would expand and lose its force before reaching the end of the teat, it would exert no siphoning action on (or in) the teat, and consequently no paint would be drawn therethrough. For present purposes, it will be assumed that the teat is one inch long. It is to be understood that we are retaining the setting of Figure 2 and putting in a new long nipple in our test gun.

By reducing the length of the teat, or by using teats of different lengths, it will be found that the peak or highest point of vacuum pull is reached when the teat is about 3/64 of an inch in length, see Figure 7, in which the base line is divided into divisions corresponding to fractions of an inch. Teat length is defined as the distance that the cylindrical end of the nipple 18 extends beyond the inner edge of the outlet of the nozzle. Thus in Fig. 9 the "teat length" is zero, because the end of the teat is in line with the inner edge of said opening and it will be seen that the teat could have a negative length, as illustrated in Fig. 3. The vertical lines extending to the full graphic line indicate the vacuum-pulls in the nipple, as expressed in mercurial inches and with eighty pounds pressure in the nozzle, and the corresponding distances to the dotted graphic line show the vacuum pulls in the nipple, also in mercurial inches but with ten pounds air pressure in the nozzle. This illustrates the fact that each pressure involves a different length of teat for maximum effect. However, assuming that the gun is to operate on 80 pounds pressure we find that the best nipple length is 3/64 inch. The vertical line a—a indicates the face of the nozzle.

In Figure 5, I have illustrated the nozzle with an elongated cylindrical extension 20. it is obvious that as the teat extends into the cylindrical bore of this extension, a vacuum pull will be exerted in the nipple, according to the pressure employed; and that as long as the compressed air is confined, it will tend to move the paint through the cylindrical bore. Little atomization will take place under these conditions, i. e., by the use of a long cylindrical extension on the nozzle, and, therefore, to secure atomization and at the same time increase the siphoning action or vacuum pull on the paint in the nipple, the cylindrical extension may be successively shortened until its highest suction pull is attained, when it will probably be as shown in Figure 6. The vacuum pull is determined as herein described. A chart similar to the one illustrated in Fig. 7 for the given or assumed pressure may be used.

By final spray nozzle and teat is meant the one that the user actually places on the gun in commercial operation. (See Fig. 3.) The test nozzle and teat is the combination in which the nozzle has a knife edge.

To ascertain the proper setting of any nozzle in regard to any nipple, connect the material conduit with the vacuum tube at means 14 and connect the air conduit with an air supply of predetermined pressure. Then turn on the air supply and adjust the test nozzle until a maximum vacuum pull is reached. This is the final and correct position.

It has been found that if a knife edge nozzle is used the relationship between this nozzle and nipple, that is, the "teat length" as above defined, will apply to any other nozzle and nipple applied to the same gun. Thus a knife edge nozzle may be used for measurement of the position of other nozzles.

Various adjustments of the lengths of the nozzle and nipple and their relative positions are indicated in Figures 9 to 12 and the corresponding effects upon the vacuum registering device are shown in Figure 13.

This series of figures brings out the fact that the best relative positions between the nipple and nozzle, as ascertained by a "knife edge" nozzle, gives the correct final positions of the parts, regardless of how said parts are later altered to more advantageous shapes. That is to say, for any given shapes, the most advantageous relative positions for such shapes are the positions as ascertained by the "knife edge" nozzle. Fig. 10 shows the best relationship between parts as ascertained with a "knife edge" nozzle. Figs. 9 and 11 show the best sizes and shapes of parts as acertained by mean hereinbefore described but with the parts out of proper position. Fig. 12 shows the properly sized and shaped parts, properly adjusted as in Fig. 10.

Fig. 13 illustrates the fact that the Fig. 10 combination will provide a four inch vacuum, the highest for the "knife edge" nozzle. Then if the parts are properly shaped the vacuum can be further increased, that is, if the parts are properly set as in Fig. 10. In Fig. 9 the parts have the best shapes but are out of position and hence the "no vacuum" reading is had as shown in Fig. 13. In Fig. 11 the relative positions of the parts are the same as in Fig. 10 but their shapes are not the most advantageous, the teat being slightly too long. Hence, a somewhat better action is attained but not the best (see Fig. 13). In Fig. 12 the parts are in the most advantageous relative positions as in Fig. 10 and furthermore they have their most advantageous shapes and hence the maximum effect is attained.

The above may be summarized as follows:

The best relative positions are ascertained by the "knife edge" arrangement and these are the best relative positions after the shapes have been changed. To get best final results, the most advantageous shapes must be had with the best relative positions of parts.

A setting as shown in Figure 11 gives a better vacuum reading than that for Figure 10 because the part sizes seem to have more effect in getting proper results than the positioning of the same with respect to each other, although both the sizes and position are factors. In Fig. 11 the knife edge has been replaced by a cylinder extending slightly beyond the teat. This is also true in Figs. 9 and 12.

In Figure 8, I have graphically illustrated the vacuum pulls at different pressures within this so-called "highest efficiency teat" 3/64 of an inch long when used with a knife-edged nozzle. Thus with this graph, which the user may obtain from the manufacturer, corresponding to a given nozzle, the user can determine the operating pressure required to obtain a given vacuum.

In view of the above, it will be seen that the several objects of the invention are achieved and other advantageous results obtained.

As many changes could be made in carrying out the above constructions without departing from the scope of the invention, it is intended that all matter contained in the above description or shown in the accompanying drawings shall be interpreted as illustrative and not in a limiting sense.

What I claim is:

1. The method of ascertaining correct final positions for nozzles and teats of spray guns which comprises applying a teat to a gun, applying a knife edged test nozzle thereto, connecting the material conduit of the gun to a vacuum register, connecting the air conduit to an air supply, adjusting the knife edged nozzle on the gun until temporary maximum conditions of vacuum are indicated on the register, whereby a correct position relationship is ascertained between the teat and the rear edge of the outlet of the final spraying nozzle to be used thereon, replacing said test nozzle with a final operating spraying nozzle of equivalent diameter and bore, and adjusting the latter to the position relationship as shown by the test nozzle.

2. The method of ascertaining correct final positions for nozzles and teats of spray guns which comprises supplying a teat to a gun, applying a knife edged test nozzle thereto, connecting the material conduit of the gun to a vacuum register, connecting the air conduit to an air supply, adjusting the knife edged nozzle on the gun until temporary maximum conditions of vacuum are indicated on the register, whereby the correct position relationship is ascertained between the teat and the rear edge of the outlet of the final spraying nozzle to be used thereon, replacing said test nozzle with a final operating spraying nozzle of equivalent diameter and bore, and adjusting the latter to the position relationship as shown by the test nozzle, and changing the length of at least one of the members of the final combination of nozzle and teat until further maximum conditions are indicated at said register.

In testimony whereof I hereunto affix my signature this 1st day of March, 1921.

W. A. HEINRICH.